United States Patent [19]

Endo et al.

[11] Patent Number: 4,837,231

[45] Date of Patent: Jun. 6, 1989

[54] SINTERED NON-OXIDE CERAMIC COMPOSITE

[75] Inventors: Hidehiro Endo; Kei Tanemoto; Hiroshi Kubo, all of Kawasaki, Japan

[73] Assignee: Nippon Steel Corporation, Tokyo, Japan

[21] Appl. No.: 44,298

[22] Filed: Apr. 30, 1987

[30] Foreign Application Priority Data

May 1, 1986 [JP] Japan ................. 61-101614

[51] Int. Cl.$^4$ ............................. C04B 35/56
[52] U.S. Cl. .................... 501/91; 501/90; 501/92; 501/93; 252/516; 252/518
[58] Field of Search ............ 501/90, 91, 92, 96, 501/93; 252/516, 518

[56] References Cited

U.S. PATENT DOCUMENTS

| | | | |
|---|---|---|---|
| 3,993,602 | 11/1976 | Prochazka | 502/90 X |
| 4,108,929 | 8/1978 | Prochazka et al. | 501/90 X |
| 4,336,216 | 6/1982 | Watanabe et al. | 501/90 X |
| 4,541,975 | 9/1985 | Homma et al. | 501/92 X |
| 4,555,358 | 11/1985 | Matsushita et al. | 501/91 X |
| 4,762,810 | 8/1988 | Endo et al. | 501/91 X |

FOREIGN PATENT DOCUMENTS

| | | | |
|---|---|---|---|
| 2813666 | 10/1978 | Fed. Rep. of Germany | 501/92 |
| 0116666 | 9/1980 | Japan | 501/92 |
| 6092167 | 7/1981 | Japan | 501/90 |
| 57-196770 | 12/1982 | Japan . | |
| 60-112669 | 6/1985 | Japan . | |
| 0155572 | 8/1985 | Japan | 501/90 |
| 1006169 | 1/1986 | Japan | 501/92 |
| 1036162 | 2/1986 | Japan | 501/91 |

OTHER PUBLICATIONS

Ceramic Industry, "Raw Materials Handbook", Jan. 1986, p. 56.
Takahashi et al, "Properties of SiC Based Electro-Conductive Ceramic Composites", J. of Cerm. Soc. of Japan, Jul. 7, 1984, pp. 123-129.
Journal of the American Ceramic Society, vol. 67, No. 8, Aug. 1984, pp. 571-574, Columbus, Ohio, U.S.; G. C. Wei et al.: "Improvements in Mechanical Properties in SiC by the Addition of TiC Particles".
American Ceramic Society Bulletin, vol. 65, No, 2, Jan. 1986, pp. 357-362, Columbus, Ohio, U.S.; M. A. Janney, "Microstructural Development and Mechanical Properties of SiC and of SiC-TiC Composites".
Journal of the Ceramic Society of Japan, Properties of SiC Based Electro-Conductive Ceramic Composites, pp. 123-129, Ken Takaiiashi, Tyutarou Jimbou, Yasuo Matsushita, Seiichi Yamada and Tetsuo Kosugi.

*Primary Examiner*—William R. Dixon, Jr.
*Assistant Examiner*—Karl Group
*Attorney, Agent, or Firm*—Cushman, Darby & Cushman

[57] ABSTRACT

A sintered non-oxide ceramic composite high in density, high-temperature strength and toughness and having optionally and widely changeable electrical conductivity is obtained by compacting and sintering a mixed powder comprising 5-95% by weight of at least one compound selected from titanium carbide, nitride and carbonitride, 0.1-5% by weight (based on silicon carbide) of boron or boron compound in terms of boron, 0.1-5% by weight (based on silicon carbide) of carbon or carbon compound in terms of residual carbon and the balance of substantially silicon carbide.

9 Claims, No Drawings

SINTERED NON-OXIDE CERAMIC COMPOSITE

BACKGROUND OF THE INVENTION

This invention relates to a sintered non-oxide ceramic composite which has high density, high high-temperature strength and high toughness and electrical conductivity which can be optionally and widely changed.

Silicon carbide (SiC) is one of the promising materials as ceramics which are high in hardness, excellent in wear resistance and oxidation resistance, small in thermal coefficient of expansion and chemically highly stable. Further, silicon carbide high density sintered body is superior in high-temperature strength and thermal shock resistance and is exposed to be used for engine parts, gas turbines, etc. as structural materials along with silicon nitride ($Si_3N_4$).

Furthermore, titanium carbide.nitride such as titanium carbide (TiC), titanium nitride (TiN), titanium carbonitride (TiCN), etc. are also known as ceramics high in hardness and excellent in wear resistance, high in electrical conductivity and high in melting point. High density sintered bodies of titanium carbide.nitride are known to have high high-temperature strength and undergo plastic deformation at high temperatures, though inferior in oxidation resistance at high temperatures and are also expected to be applied as high-temperature structural materials like silicon carbide.

However, ceramic materials including SiC sintered body are generally brittle materials and low in toughness and are readily broken due to surface or internal micro-defects or abrupt stress concentration. Thus, they are poor in reliability.

Moreover, ceramic materials are generally high in hardness and, except for titanium carbide.nitride and the like, are difficultly workable materials because of low electrical conductivity and inferior electrical discharge workability. This problem in workability is one cause for delay in commercialization of ceramics.

In order to improve toughness of ceramic materials, for example, zirconia ($ZrO_2$), there have been made researches to improve toughness by partial stabilization of zirconia by addition of yttrium oxide ($Y_2O_3$), magnesium oxide (MgO), calcium oxide (CaO), etc. and the product has been known as partially stabilized zirconia (PSZ).

With reference to non-oxide ceramics including SiC, substantially few researches have been made for improvement of their toughness, but according to "J. Am. Ceram. Soc." Vol. 67, No. 8 (1984), pages 571–574, to silicon carbide (SiC) were added titanium carbide (TiC) and aluminum (Al) and carbon (C) as sintering aids to improve fracture toughness ($K_{IC}$) of the resulting sintered body.

On the other hand, for improving electrical conductivity of silicon carbide (SiC), "Journal of the Japanese Ceramic Society", Vol. 93, No. 3 (1985), pages 123–129 discloses that to SiC is added titanium carbide (TiC), titanium nitride (TiN), zirconium carbide (ZrC), tungsten carbide (WC), zirconium boride ($ZrB_2$), titanium boride ($TiB_2$), hafnium boride ($HfB_2$), niobium boride ($NbB_2$), tantalum boride ($TaB_2$) or the like at 50% by volume and is further added 2% by weight of $Al_2O_3$ as a sintering aid for SiC and then the mixture is subjected to hot press sintering to sharply reduce resistiviy of the sintered body. Furthermore, Japanese Patent Kokai (Laid-Open) No. 196770/82 discloses addition to SiC of 0.5–30% by volume of at least one member selected from carbides, nitrides, borides and oxides of elements of Groups IVa, Va and VIa of the periodic table and aluminum carbide ($Al_4C_3$), thereby to obtain sintered bodies improved in electical conductivity and superior in electric discharge workability. However, this publication makes no mention of sintering aids for SiC.

It is difficult to sinter SiC alone owing to its markedly high covalent bonding. Therefore, production of sintered composites having desirable characteristics such as high density, high strength, etc. becomes possible only with addition of a specific sintering aid to SiC. When aluminum (Al) or aluminum compounds are used as a sintering aid for SiC as reported in the above "J. Am. Ceram. Soc." and "Journal of the Japanese Ceramic Society", sintered bodies of high density can be obtained, but high-temperature strength at 1200°–1500° C. is extremely deteriorated.

According to Japanese Patent Kokai (Laid-Open) No. 112669/85, growth of crystal grains of SiC sintered body is prevented by adding 0.1–1.0% by weight of TiN to SiC with addition of boron or boron compounds and carbon or carbon compounds as a sintering aid. However, addition of TiN in such small amount of 0.1–1.0% by weight cannot afford sufficient increase of fracture toughness and besides, remarkable improvement of electrical conductivity cannot be expected.

SUMMARY OF THE INVENTION

It is an object of this invention to provide a sintered non-oxide ceramic body with high density, excellent high-temperature strength, high toughness and electrical conductivity capable of being widely changed.

The sintered non-oxide ceramic body of this invention is produced by combining SiC with at least one of carbides, nitrides and carbonitrides of titanium such as TiC, TiN and TiCN together with simultaneous addition of boron or a boron compound and carbon or a carbon compound which is a sintering aid and sintering the mixture.

That is, this invention relates to a sintered non-oxide ceramic composite obtained by compacting and sintering a mixed powder comprising 5–95% by weight, preferably 10–90% by weight, more preferably 30–70% by weight of at least one compound selected from carbides, nitrides and carbonitrides of titanium, 0.1–5% by weight (based on silicon carbide and in terms of boron) of boron or boron compound, 0.1–5% by weight (based on silicon carbide and in terms of residual carbon) of carbon or a carbon compound and the balance being essentially silicon carbide.

Density of the sintered body of this invention is preferably at least 85% of the theoretical value.

DETAILED DESCRIPTION OF PREFERRED EMBODIMENTS OF THE INVENTION

This invention will be explained in detail below. The sintered composite of this invention has electrical conductivity which can be optionally chosen between its lower level and higher level by relatively changing the blending ratio of SiC and titanium carbide.nitride and which further possesses both the high high-temperature strength and high toughness.

The mechanism how the toughness and electrical conductivity of the sintered SiC-titanium carbide.nitride composite of this invention are improved has not yet been elucidated, but it is supposed as follows:

That is, with reference to the toughness, in the sintered ceramic composite, SiC and titanium carbide.nitride have micro-structure where respective particles are dispersed even after sintering and crack propagation from fracture origin is deflected, resulting in improvement of strength and toughness. With reference to the electrical conductivity, it is supposed that titanium carbide.nitride which are superior in electrical conductivity are homogeneously dispersed in the ceramic composite and contact with each other to form network of electrical conduction and improve conductivity.

Furthermore, sintered composites of high density can be obtained by joint addition of boron or boron compound and carbon or carbon compound as sintering aids. When the sintering aid for SiC is not added, sintered bodies of high density can hardly be obained and it becomes difficult to make ceramics of high toughness and high-temperature strength which are intended by this invention.

Boron or boron compound and carbon or carbon compound added as sintering aids are considered to have the following roles: Carbon or carbon compounds reduces and removes the silicon oxide ($SiO_2$) film formed on SiC particles to increase surface energy of the SiC particles and activate them. On the other hand, boron (boron in boron compound) diffuses into the activated SiC particle surface to decrease the surface energy of SiC particles, whereby surface diffusion of SiC particles are inhibited and diffusion and boundary diffusion of SiC particles are promoted to accerelate densification of SiC.

Aluminum (Al) and aluminum compounds have also been known as sintering aids for SiC. However, when aluminum or aluminum compound is used as a sintering aid for SiC, a sintered body of high density can be obtained, but there is formed mainly an $Al_2O_3$—$SiO_2$ glass phase at grain boundary in the sintered body, which deteriorates high-temperature strength at 1200°–1500° C.

Sintered non-oxide ceramic bodies of high density, high high-temperature strength and high toughness and electrical conductivity can be produced only by combining SiC with titanium carbides, nitrides or carbonitrides such as TiC, TiN and TiCN with simultaneous addition of boron or boron compound and carbon or carbon compound and the problems of low toughness and low electrical conductivity common to ceramic materials have been solved.

The SiC powders used in this invention include those of $\beta$-type or $\alpha$-type in crystalline form or mixed powders of them or amorphous SiC powders and are chemically high pure ultrafine powders of normally 10 $\mu$m or less, preferably 1 $\mu$m or less (submicron) in average particle size.

Carbides, nitrides and carbonitrides (these may be called merely "carbide.nitride") of titanium which are combined with SiC may be any of TiC, TiN, a mixed powders of them or carbonitride (TiCN) and amount of them is 5–95%, preferably 10–90%, most preferably 30–70% by weight of the total amount. These titanium carbide.nitride are chemically highly pure ultrafine powders of normally 10 $\mu$m or less, preferably about 1 $\mu$m in average particle size. When amount of the titanium carbide.nitride is less than 5% by weight, effect of powder dispersion with SiC powders is not seen and remarkable increase of toughness cannot be expected. When the amount is more than 95% by weight, the effect of powder dispersion is small and oxidation resistance at high temperature is deteriorated.

As sintering aids for SiC, 0.1–5%, preferably 0.3–3% by weight of boron or boron compound in terms of boron and based on the amount of SiC and 0.1–5%, preferably 0.3–3% by weight of carbon or carbon compound in terms of carbon and based on the amount of SiC are simultaneously added.

As boron or boron compound, there may be used, alone or in combination of two or more, metallic boron (B) or boron compounds such as boron carbide ($B_4C$), boron nitride (BN), boron oxide ($B_2O_3$) and the like. When the amount of boron or boron compound is less than 0.1% by weight of SiC in terms of boron, dense sintered body can hardly be obtained and when more than 5% by weight, the preferred characteristics of sintered SiC-titanium/carbide.nitride composite are damaged.

As carbon or carbon compound, there may be used, alone or in combination of two or more, carbon black, acetylene black and the like and furthermore organic materials such as phenolic resins, polyvinyl alcohol, corn starch, sugars, coal tar pitch and the like which provide residual carbon upon sintering. When the amount of carbon or carbon compound is less than 0.1% by weight of SiC in terms of residual carbon, dense sintered body can hardly be obtained and when more than 5% by weight, the preferred characteristics of the sintered SiC-titanium carbide.nitride composite are damaged.

As explained above, it becomes possible to produce a sintered non-oxide ceramic composite having preferred characteristics such as high density, high-temperature strength, toughness and electrical conductivity of combining SiC with titanium carbide.nitride such as TiC, TiN and TiCN with simultaneously adding boron or boron compound and carbon or carbon compound as sintering aids for SiC. It is not easy to accurately determine the theoretical density of such composite ceramics as of this invention, but in order to obtain the above-mentioned preferred characteristics, it is necessary that the sintered body has a density of at least 85% of theoretical value, especially preferably at least 90% of the theoretical value.

For sintering, there may be employed any of known sintering methods such as pressureless sintering, hot press sintering, hot isostatic pressure sintering (HIP), etc.

This invention will be further explained by the following examples.

EXAMPLE 1

To SiC powder ($\beta$-type crystal of 0.3 $\mu$m in average particle size and at least 98% in purity) was added TiC powder (1.2 $\mu$m in average particle size and at least 99% in purity) at the weight ratios as shown in Table 1 and these were well mixed in a ball mill. Then, the mixture was subjected to hot press sintering at 2150° C. and under a pressure of 40MPa for 2 hours in an argon atmosphere. $B_4C$ as a boron compound was added in an amount of 1% by weight of SiC in terms of boron and carbon black as a carbon compound was also added in an amount of 1% by weight of SiC.

Thus obtained sintered body was worked into a test piece of 3 mm×4 mm×38 mm according to JIS R1601 and density thereof was measured by water displacement method. Thereafter, the test piece was subjected to three-point bending test at room temperature and a high temperature of 1500° C. in argon gas. The fracture toughness of the sintered body was evaluated by IM (Indentation Microfacture) method and SEPB (Single Edge Pre-Crack Beam) method which comprises introducing pre-cracks into the sintered body by pop-in and obtaining $K_{IC}$.

TABLE 1

| Amount of SiC (*) (wt %) | Addition amount of TiC (wt %) | Relative density (%) | Three-point bending strength (MPa) | | Fracture toughness $K_{IC}$ (MPa m$^{\frac{1}{2}}$) | |
|---|---|---|---|---|---|---|
| | | | Room temp. | 1500° C. | IM method | SEPB method |
| 100 | 0 | 99.2 | 780 | 1100 | 2.1 | 1.7 |
| 95 | 5 | 99.1 | 800 | 1050 | 3.2 | 2.2 |
| 90 | 10 | 98.8 | 810 | 1180 | 4.4 | 3.0 |
| 70 | 30 | 99.0 | 830 | 1170 | 5.8 | 5.1 |
| 50 | 50 | 98.8 | 750 | 980 | 7.4 | 6.0 |
| 30 | 70 | 99.3 | 680 | 720 | 6.1 | 5.2 |
| 10 | 90 | 99.2 | 630 | 650 | 4.4 | 3.7 |
| 5 | 95 | 99.3 | 620 | 610 | 4.0 | 3.1 |
| 0 | 100 | 99.8 | 550 | 530 | 3.5 | 2.8 |

(*) Containing B and C in an amount of 1% by weight for SiC, respectively.

Table 1 shows relative densities (in percent for theoretical value), average three-point bending strengths at room temperature and a high temperature (1500° C.) and $K_{IC}$ values of the sintered bodies of respective compositions.

It is recognized from Table 1 that strength at room temperature and high temperatures is improved by combining SiC with TiC, especially the strength becomes maximum when addition amount of TiC is 5-30% by weight and the strength is not deteriorated even at a high temperature of 1500° C. It is also clear that $K_{IC}$ is markedly improved when SiC is combined with TiC as compared with monolithic SiC and monolithic TiC and the $K_{IC}$ becomes maximum with addition of TiC in an amount of about 50% by weight.

EXAMPLE 2

β-type SiC of 0.3 μm in average particle size and 98% or more in purity which was similar to that used in Example 1 was well mixed in a ball mill with TiC powder (average particle size: 1.2 μm and purity: 99% or more) and TiN powder (average particle size: 1.2 μm and purity: 99% or more) at the weight ratios as shown in Table 2 and the mixture was subjected to hot press sintering at 2150° C. for 2 hours under 40 MPa in an argon inert atmosphere. As in Example 1, B$_4$C as a boron compound was added in an amount of 1% by weight of SiC in terms of boron and carbon black as a carbon compound in an amount of 1% by weight of SiC. Toughness of the resulting sintered bodies was evaluated by measuring fracture toughness $K_{IC}$ in accordance with SEPB method as in Example 1.

Table 2 shows relative densities (in percent for theoretical value) and $K_{IC}$ values of the sintered bodies of respective composition.

It is clear from Table 2 that when SiC is combined with titanium carbide.nitride, fracture toughness $K_{IC}$ is markedly improved as compared with monolithic SiC, monolithic TiC and monolithic TiN.

TABLE 2

| Amount of SiC (**) (wt %) | Addition amount of TiC (wt %) | Addition amount of TiN (wt %) | Relative density (%) | Fracture toughness $K_{IC}$ (MPa m$^{\frac{1}{2}}$) SEPB method |
|---|---|---|---|---|
| 100 | 0 | 0 | 99.2 | 1.7 |
| 90 | 0 | 10 | 93.1 | 2.8 |
| 70 | 0 | 30 | 95.0 | 4.5 |
| 50 | 0 | 50 | 98.9 | 4.5 |
| 0 | 0 | 100 | 91.8 | 2.6 |
| 90 | 5 | 5 | 93.6 | 2.7 |
| 80 | 10 | 10 | 98.7 | 4.0 |
| 50 | 25 | 25 | 99.3 | 5.7 |

(**) Containing B and C in an amount of 1% by weight for SiC, respectively.

EXAMPLE 3

Electrical conductivity was measured for the sintered bodies made in Examples 1 and 2. Table 3 shows electrical conductivities of the sintered ceramic composites of respective compositions.

TABLE 3

| Amount of SiC(***) (wt %) | Addition amount of TiC (wt %) | Addition Amount of TiN (wt %) | Electrical conductivity ($\Omega^{-1} \cdot cm^{-1}$) |
|---|---|---|---|
| 100 | 0 | 0 | $1.8 \times 10^{-2}$ |
| 90 | 10 | 0 | 9.0 |
| 70 | 30 | 0 | $2.6 \times 10^2$ |
| 50 | 50 | 0 | $2.3 \times 10^3$ |
| 30 | 70 | 0 | $5.0 \times 10^3$ |
| 10 | 90 | 0 | $1.0 \times 10^4$ |
| 0 | 100 | 0 | $1.4 \times 10^4$ |
| 90 | 0 | 10 | 3.0 |
| 70 | 0 | 30 | $2.3 \times 10^2$ |
| 50 | 0 | 50 | $2.4 \times 10^3$ |
| 0 | 0 | 100 | $4.7 \times 10^4$ |
| 90 | 5 | 5 | $1.6 \times 10$ |
| 80 | 10 | 10 | $1.0 \times 10^2$ |
| 50 | 25 | 25 | $3.0 \times 10^3$ |

(***) Containing B and C in an amount of 1% by weight for SiC, respectively.

Table 3 indicates that electrical conductivity is conspicuously improved by combining SiC with TiC and TiN as compared with monolithic SiC.

EXAMPLE 4

To β-type SiC of 0.3 μm in average particle size and 98% or more in purity which was the same as used in Example 1 was added 50% by weight of TiC powder (average particle size: 1.2 μm and purity: 99% or more) and were further added B$_4$C and carbon black at the weight ratios as shown in Table 4. These powders were well mixed in a ball mill and the resulting mixture was subjected to hot press sintering at 2150° C., for 2 hours and under 40 MPa in an argon atmosphere. Strength and toughness of thus obtained sintered bodies were evaluated in the same manner as in Example 1. Table 4 shows relative density (in percent for theoretical value), three-point bending strength and $K_{IC}$ of the sintered bodies of respective addition amounts of B$_4$C and C. It is seen from Table 4 that sintered bodies having high density and excellent characteristics can be obtained by adding suitable amounts of B$_4$C and C.

TABLE 4

| Amount of SiC (wt %) | Amount of TiC (wt %) | Amount of B$_4$C (wt %) | Amount of C (wt %) | Relative density (%) | Three-point bending strength (MPa) | | Fracture toughness $K_{IC}$ (MPa m$^{\frac{1}{2}}$) SEPB method |
|---|---|---|---|---|---|---|---|
| | | | | | Room temperature | 1500° C. | |
| 48.75 | 50 | 0.25 | 1.0 | 98.7 | 750 | 980 | 6.0 |

TABLE 4-continued

| Amount of SiC (wt %) | Amount of TiC (wt %) | Amount of B$_4$C (wt %) | Amount of C (wt %) | Relative density (%) | Three-point bending strength (MPa) | | Fracture toughness K$_{IC}$ (MPa m$^{\frac{1}{2}}$) SEPB method |
|---|---|---|---|---|---|---|---|
| | | | | | Room temperature | 1500° C. | |
| 47.75 | 50 | 0.25 | 2.0 | 98.8 | 750 | 980 | 6.0 |
| 47.0 | 50 | 1.0 | 2.0 | 98.8 | 740 | 980 | 6.0 |

Comparative Example

In order to examine the effects of boron or boron compound and carbon or carbon compound as sintering aid for SiC, measurements were conducted on SiC and TiC composite ceramics where no sintering aid was added and aluminum oxide (Al$_2$O$_3$: average particle size: 0.2 μm and purity: 99.9% or more) was added in an amount of 2% by weight of the total weight as a sintering aid. Powders were prepared at the weight ratios as shown in Table 5 and well mixed in a ball mill in the same manner as in Example 1. The resulting mixture was subjected to hot pressing at 2150° C., for 2 hours, under 40 MPa in an argon inert atmosphere. The sintered bodies were made into test pieces and subjected to bending test in the same manner as in Example 1.

Table 5 shows relative density (in percent for theoretical value) and results of three-point bending test at room temperature and a high temperature of 1500° C. of the sintered bodies of respective compositions.

TABLE 5

| Amount of SiC (wt %) | Addition amount of TiC (wt %) | Addition amount of Al$_2$O$_3$ (wt %) | Relative density (%) | Three-point bending strength (MPa) | |
|---|---|---|---|---|---|
| | | | | Room temp. | 1500° C. |
| 90 | 10 | 0 | 80.2 | 140 | — |
| 50 | 50 | 0 | 89.8 | 180 | — |
| 88 | 10 | 2 | 99.9 | 630 | 190 |
| 68 | 30 | 2 | 99.6 | 650 | 240 |
| 48 | 50 | 2 | 99.2 | 600 | 250 |

It is clear from Table 5 that when no sintering aid was used in SiC-TiC ceramic system, sintered bodies of high density can hardly be obtained and strength is very low and when Al$_2$O$_3$ was used as a sintering aid, sintered bodies of high density can be obtained, but high-temperature strength at 1500° C. is conspicuously deteriorated.

According to this invention, sintered nonoxide ceramic bodies high in density and excellent in high-temperature strength, toughness and electrical conductivity can be obtained by combining silicon carbide with at least one selected from carbide, nitride and carbonitride of titanium with simultaneous addition of boron or boron compound and carbon or carbon compound. The sintered non-oxide ceramic composites of this invention are free from the problems of low toughness and low reliability common to ceramic materials and besides, electric discharge works can be widely applied.

What is claimed is:

1. A sintered non-oxide ceramic composite having a high density, high-temperature strength of at least 650 MPa of from room temperature to 1,500° C. and a toughness of greater than 5 MPam $\frac{1}{2}$ and capable of having widely changeable electrical conductivity, which is produced by compacting and sintering a mixed powder which comprises 30-70% by weight of titanium carbide, 0.1-5% by weight of boron or boron compound on the basis of the weight of silicon carbide and, in terms of boron, 0.1-5% by weight of carbon or an organic carbon compound on the basis of the weight of silicon carbide, and in terms of residual carbon and the balance being substantially silicon carbide.

2. A sintered body according to claim 1, which has a density of at least 85% of theoretical value.

3. A sintered body according to claim 1, wherein the amount of boron or boron compond is 0.3-3% by weight of silicon carbide and in terms of boron and that of carbon or organic carbon compound is 0.3-3% by weight of silicon carbide and in terms of residual carbon.

4. A sintered body according to claim 1, wherein the silicon carbide powder is a crystalline α-type powder, α-type powder, a mixed powder thereof or an amorphous powder.

5. A sintered body powder according to claim 6, wherein the silicon carbide powder has an average particle size of 10 μm or less.

6. A sintered body according to claim 7, wherein the silicon carbide powder has an average particle size of 1 μm or less.

7. A sintered body according to claim 1, wherein boron or boron compound is at least one member selected from the group consisting of metallic boron, boron carbide, boron nitride and boron oxide.

8. A sintered body according to claim 1, wherein carbon or organic carbon compound is an organic material which provides residual carbon when sintered.

9. A sintered body according to claim 10, wherein the organic carbon material is carbon black, acetylene black, phenolic resin, polyvinyl alcohol, corn starch, sugars or coal tar pitch.

* * * * *